United States Patent

Ayers

[15] 3,684,095
[45] Aug. 15, 1972

[54] BARGE BASED SKIMMING SYSTEM FOR OIL SLICKS

[72] Inventor: Ray R. Ayers, 12522 Shepherd's Ridge Drive, Houston, Tex. 77077

[22] Filed: Sept. 8, 1970

[21] Appl. No.: 70,097

[52] U.S. Cl. ............................. 210/242, 210/DIG. 21
[51] Int. Cl. .................................................. C02b 9/02
[58] Field of Search .................. 210/83, 242, DIG. 21

[56] References Cited

UNITED STATES PATENTS

| | | | |
|---|---|---|---|
| 3,523,611 | 8/1970 | Fitzgerald | 210/242 |
| 3,557,960 | 1/1971 | Fitzgerald | 210/242 |
| 1,573,085 | 2/1926 | Melani | 210/DIG. 21 |
| 3,556,301 | 1/1971 | Smith | 210/DIG. 21 |
| 3,369,664 | 2/1968 | Dahan | 210/DIG. 21 |

FOREIGN PATENTS OR APPLICATIONS

| | | | |
|---|---|---|---|
| 1,528,855 | 5/1968 | France | 210/DIG. 21 |

Primary Examiner—Reuben Friedman
Assistant Examiner—T. A. Granger
Attorney—Harold L. Denkler and Theodore E. Bieber

[57] ABSTRACT

A barge based skimming system for oil slicks and method for use thereof wherein the oil phase is concentrated relative to the water phase prior to its introduction into a final separating compartment wherein the oil is reclaimed in a conventional manner. A barge mounted wave reflector and boom arrangement diverts oil and water into open bottom chutes positioned on either side of a barge. The wave action is damped at the upstream end of the chutes and a skimming operation is performed downstream thereof to divert floating oil upwardly onto a shelf-like structure while allowing the underlying water to continue its passage through the open bottom chute. The shelf structure then directs the oil to a relatively quiescent area defined by a separating container at the rear of the barge where a second separating operation is conducted and the oil reclaimed.

4 Claims, 4 Drawing Figures

PATENTED AUG 15 1972 3,684,095

INVENTOR
RAY R. AYERS

BY Harold L. Henkler
ATTORNEYS.

BARGE BASED SKIMMING SYSTEM FOR OIL SLICKS

BACKGROUND OF THE INVENTION

The recent upsurge of national concern for environmental pollution control coupled with increased offshore drilling and the substantial financial losses incident to oil spills, whether from offshore drilling locations or damaged tankers, have stimulated the recent development of a number of different type systems to remove oil slicks from a body of water. One of the earlier developments which still finds favor today involves a mechanical skimming or separation of the oil and water at their interface. When used on inland or other relatively placid bodies of water the previously known skimmers are reasonably efficient and are favored because of their simplicity and relatively straight forward method of operation which merely involves their positionment in the path of a moving oil slick or their movement back and forth across the same. The far greater majority of slicks are not, however, found on placid inland waters but rather on the open sea.

One of the primary difficulties with seagoing skimmers of the conventional type is their relatively low reclamation capacity per unit time in comparison with their bulk. Even normal wave action at sea causes the plane of a skimming element to rise above and dip below the oil-water interface thus failing to skim at a sufficient depth to remove the surface oil layer or skimming at such depth as to take in a substantial quantity of water thus resulting in a lower oil to water reclamation ratio than would be the case were the water perfectly still so that the skimmer could move at a substantially constant depth at the oil-water interface. In the case of calm seas this problem has been substantially reduced by the use of relatively heavy, and therefore stable, floating supports to which is hinged a skimming element that is float supported at its free or skimming end so that it may follow a gently rolling sea. It is quite apparent that as the seas roughen the skimmer cannot faithfully follow the wave contours and such wave action dictates on the one hand that a substantial portion of the slick will not be skimmed, as that on the back side of a wave over which the skimmer is cresting, and on the other that a substantial depth of water will be skimmed along with the oil as the skimmer fails to move upwardly in the face of an onwardly moving wave front. Thus even pivotally mounted float supported skimmers plunge into and ride above such waves so that their efficiency is greatly decreased at the very time when it is most important to continue skimming due to the slick spreading action of the higher seas.

The general concept of "wave damping" has been previously proposed to improve reclamation capacity and the means of achieving this function have varied from the provision of floatable barriers to one of the more common systems of oil slick recovery which involves a first oil spill containment operation to confine the oil slick to a definitive areas such as may be outlined by a plurality of floating booms or the like followed by a subsequent skimming or harvesting operation. The spill containment operation normally involves the deployment and individual end-to-end securement of the booms from a barge as the same moves along the outer limits of the spill area. The disadvantages are obvious. Seagoing barges are not only expensive to obtain and operate but rough surface conditions present a substantial hazard to the barge crew during the confining operation and tends to spread the slick so that total confinement, even in a peripheral extent, is usually not possible. Furthermore, even a normal sea surface creates such turbulence that a substantial portion of the slick escapes the confining boom area by passage both above and below the booms. After the confining operation is completed, a conventional skimmer which may or may not be barge supported works within the confined area to reclaim the oil. Alternatively an oil sorptive material such as straw or the like may be spread over the surface and subsequently harvested.

In order to avoid the necessity of a separate confining operation it has been previously proposed to "herd" or direct the oil slick toward a barge mounted skimmer by means carried on or connected to the barge, itself, as in U. S. Pat. Nos. 1,591,024 and 3,219,190. Barge mounted systems of this type are far more efficient in heavy seas than are the relatively light-weight units exemplified by U. S. Pat. No. 3,237,774 because of their greater stability. The limiting factor, however, in any skimming operation is basically the positionment of the skimmer element relative to the oil-water interface which is a function of surface conditions at the skimmer and the flow resistance differentials created by movement of the skimmer relative to the slick. In this latter connection, the oil slick tends to follow a path of least resistance which is away from the oncoming skimmer which results in even lesser oil-water concentration, lower reclamation capacity and the necessity for larger equipment.

SUMMARY OF THE INVENTION

The invention is directed to improved apparatus for removing oil slicks from open seas. The necessity for a separate confining operation is avoided by the provision of a more or less temporary confinement of a discrete portion of the slick simultaneously with the diversion thereof into a combined wave damping and two stage separating portion of a barge based skimming system. This may be achieved by the use of a barge connected, outwardly divergent, boom system to direct the slick into the wave damping and separating portion of the system. More specifically the boom system directs or funnels oil toward the bow of a barge supporting the separating and reclaiming portion of the system and the reflected waves created on either side of the bow tend to cancel or damp incoming wave motion in the immediate area of the bow. From the bow area the damped slick is led into open bottom chutes on either side of the bow and through further wave damping mechanism constituted by pivoted flaps whose free ends are biased downwardly downstream of their pivot points. The relative motion between the barge and slick may be effected by moving the barge back and forth across the slick area or by stationing the barge in a well defined slick flow path such as that which may occur immediately adjacent an offshore well.

Relative movement between the barge and slick directs a portion of the slick into laterally defined oil slick flow paths which include the previously mentioned pivoted wave dampers at the upstream ends thereof. The oil flow paths then pass through first stage skimmers from whence they are diverted upwardly onto shallow shelf-like structures that terminate in a conventional separating compartment at the rear of the barge. The so-called oil flow paths which are diverted upwardly at the first stage skimmers are, of course, a high oil-water ratio mixture derived from the first stage skimmers. The rejected product of the first stage skimmers, which includes the underlying water and any portion of the oil slick in the chute not recovered by the first stage skimmers, then pass beneath the shelf-like structures and continues its course through the open bottom chutes and through the open downstream ends thereof. It will be appreciated that the first stage skimming operations take place in the relatively queiscent areas downstream of the pivoted wave dampers and the two phase oil-water mixtures now containing relatively heavy oil concentrations are directed along the downstream portion of their flow paths to the single conventional type separating container comprising a sheltered second stage of the separating system at the stern of the barge from which the oil may be reclaimed in conventional manner.

Previous skimmers employing single stage separators, corresponding to the second stage separator of this invention, have had a much lower capacity in comparison to the overall size of the floating system because the oil phase was not concentrated before reaching the final skimming compartment thus necessitating a larger compartment.

An important feature of the invention resides in the integrated wave damping, oil confining and first stage separator construction which, basically, involves nothing more than a pair of pivoted flap members, one serving to damp oncoming wave motion and the other to perform an initial skimming operation. Both of these pivoted flap members substantially bridge the open bottom chutes laterally defined by the supporting barge hull and outrigger structure in the form of vertical walls. The forward ones of the pivoted flaps damp oncoming wave motion as the same enters the chutes where the lateral walls thereof define a relatively quiescent area rearwardly of the wave damping flaps in which the first separating or skimming operation takes place. The underlying rejected water from the first skimming operation merely continues along its original flow path through the open bottom chutes and through the open rearward ends thereof so that there is no necessity to synchronize barge movement with a water removal or drainage operation in the first stage operation as in the case of conventional skimmers and, indeed, as in the case of the second stage separator of this invention. The distinction is that prior to the time the oil-water mixture reaches the conventional second stage skimmer, the oil phase has been greatly concentrated due to the action of the first stage skimmer which first stage skimmer has no inherent capacity limitations. Stated differently, the limiting factors in the recovery rate from a conventional separator, such as the second stage separator of this invention, are the capacity of the separating mechanism to remove the oil and dump or drain the underlying water. Because of the action of the first stage separators the oil phase is greatly concentrated thus providing for more efficient second stage separation while the water phase is greatly reduced. This desirable phase mixture is made possible by the wave damping structure and first stage skimmer.

An important consideration is the fact that it is unnecessary to handle the water phase which is separated in the first stage since it merely continues along its original flow path. Thus there are provided two distinct flow paths through the chutes which paths separate at the first stage separator. The oil flow path terminating in a second stage separator and the water flow path continuing through the downstream ends of the open chutes.

DESCRIPTION OF THE PREFERRED EMBODIMENT

Figure 1:
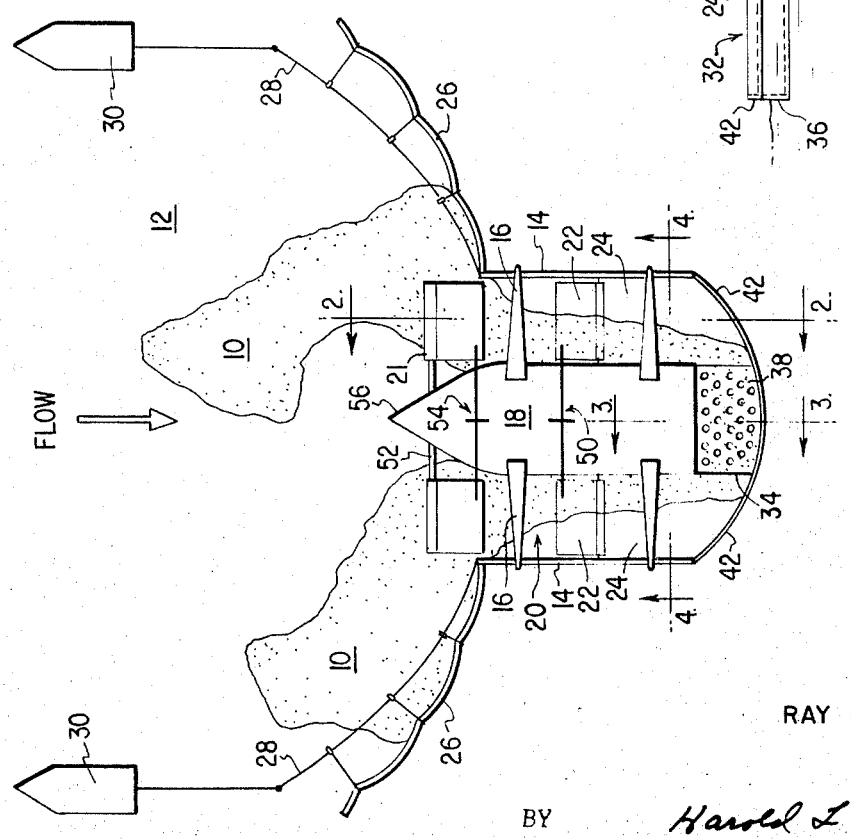
FIG. 1 is a schematic plan view of the barge based skimming system.

In FIG. 1 is illustrated a barge based skimming system in the process of removing an oil slick 10 from the surface of a body of water 12. Outriggers 14 are rigidly mounted on supports 16 in spaced relation to the sides of barge 18 to define open bottom chutes 20 therebetween within each of which is mounted a wave damper 21, first stage separator or skimmer 22 and a shallow fluid shelf 24 onto which the product of the first stage separation may be diverted. Conventional flexible oil control booms 26 are tethered to tow cables 28 interconnected between outriggers 14 and towing barges 30. Positioned astern of barge 18 is a second stage separator 32 comprising a conventional separating compartment defined by imperforate side and rear walls 34, 36, the stern of barge 18 and the usual perforate bottom wall 38. A conventional skimmer 40 reclaims oil from separator 32 in the usual manner. Skimmer 40 may take the form of any of a wide variety of commercially available types such as that bearing the designation Swiss Oela III, manufactured by H. Hammerli, Route du Stand 68–70, 1260 Nyon, Switzerland. The upper edges of side walls 34 merge smoothly with shelves 24 in flow conducting relationship while rear wall 36 extends upwardly above the level of shelves 24 and includes upstanding flow diverting wings 42 extending laterally to join the rear ends of outriggers 14.

Figure 4:
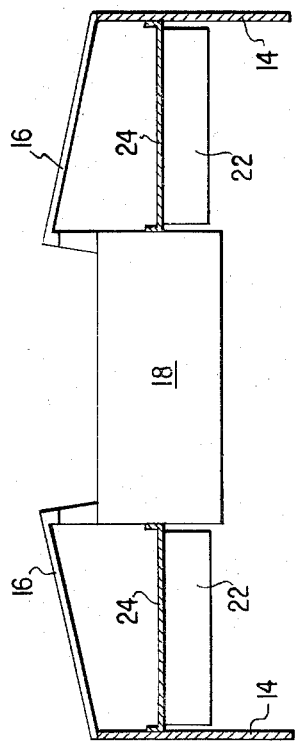
FIG. 4 is a sectional view taken along line 4—4 of FIG. 1.
Figure 3:
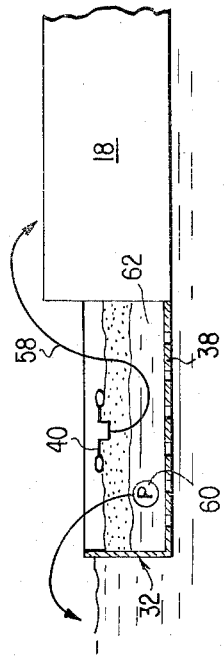
FIG. 3 is a sectional view taken along line 3—3 of FIG. 1.
Figure 2:
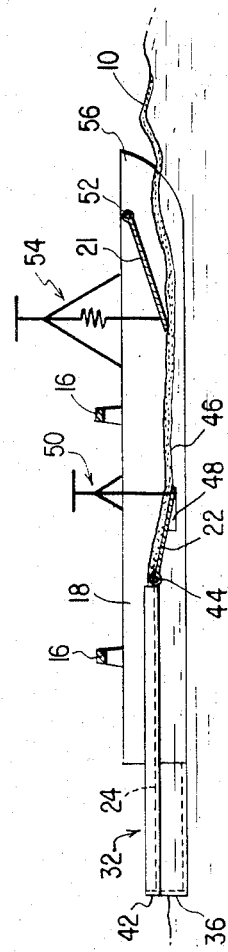
FIG. 2 is a sectional view taken along the line 2—2 of FIG. 1.

Skimmers 22 assume the form of conventional splitter type skimming elements, or flaps, extending substantially the full width of chutes 20. With reference to FIGS. 1 and 2 it will be seen that each skimmer 22 is mounted for pivotal movement about the axis of pivots 44 extending between the outrigger and barge and is normally maintained at the oil-water interface 46 by the coaction of float elements 48 and a screw adjustable upper stop assembly 50. Similar flap elements having their free ends downstream of their pivot axis 52 comprise the wave dampers 21 whose free ends are normally biased downwardly to a position adjacent the surface of oil slick 10 by adjustable shock assembly 54.

In operation, the barge based skimming system may be maintained in an oil slick flow path or towed back and forth thereacross by barges 30. Boom structures 26 direct portions of the slick into chutes 20. Oncoming wave motion is partially damped by the turbulence created by those reflected waves created at bow 56 which are out of phase with the remaining wave motion in the bow area. Wave motion is further damped by passage beneath wave dampers 21 so that a relatively quiescent surface area exists just upstream of the first stage skimmers 22. Consequently, the free upstream edge of skimmers 22 can substantially follow interface 46 under the bias of floats 48 to divert a high oil-water ratio mixture onto shelf 24 which bridges the aft portion of chutes 20 above the fluid level therein and defines laterally delimited fluid flow paths along the upper surfaces of shelves 24 terminating in compartment 32. Chutes 20, being open at their bottoms and ends, present minimal resistance to the rejected water flow therethrough while the shallow flow shelves 24 present minimal flow resistance in comparison to that exerted by the booms and the barge hull thus facilitating the first stage skimming and diverting operation. The oil-water mixture flowing along shelves 24 is diverted into the second stage separator 32 by wings 42 where the second stage separation and reclamation is performed by skimmer 40 as indicated by the arrows 58 while the underlying water flows out through perforated bottom wall 38. Recovery rates may be increased by providing an overboard sump pump 60 to hasten the depletion of the underlying water 62 in separator 32, if desired.

I claim as my invention:

1. Apparatus for removing oil from the surface of a body of water, comprising:
   a vessel with a bow, stern, and sidewalls adapted to float on the surface of a body of water;
   a compartment at the stern of said vessel;
   skimming means in the compartment, whereby oil may be separated from oil-water mixtures received in the compartment;
   outrigger structure supported by the vessel, spaced from the sidewalls, and projecting above and below the surface of the body of water, whereby a chute is defined with an end in communication with the compartment;
   damping means in the chute for damping the vertical movement of oil and water therein;
   skimming means in the chute, whereby the oil-water mixtures are separated from the body of water; and
   a shallow shelf bridging the chute above the lower level thereof and extending from the chute to the compartment for communicating the oil-water mixtures to the compartment.

2. The apparatus of claim 1 wherein said damping and skimming means comprise flap elements pivoted adjacent one end thereof to said outrigger structure and substantially bridging said chute, and means for biasing the free ends of said flaps.

3. The apparatus of claim 2 wherein the free end of one of said flaps is biased toward the oil-water interface in the chute and the upper surface of the other end thereof is in fluid flow communication with said compartment.

4. The apparatus of claim 3 wherein the other of said flaps is pivotally mounted at the upstream end of said chute and the free ends of said flaps are oriented downstream.

* * * * *